United States Patent
Bussear et al.

(10) Patent No.: US 6,712,141 B1
(45) Date of Patent: Mar. 30, 2004

(54) METHOD AND APPARATUS FOR DEPLOYMENT, MOUNTING AND COUPLING OF DOWNHOLE GEOPHONES

(75) Inventors: Terry R. Bussear, Friendswood, TX (US); Michael W. Norris, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/694,141

(22) Filed: Oct. 23, 2000

Related U.S. Application Data

(60) Provisional application No. 60/165,272, filed on Nov. 12, 1999.

(51) Int. Cl.⁷ .......................... E21B 47/00; E21B 47/01; G01V 1/40
(52) U.S. Cl. ............... 166/250.17; 166/66; 166/250.01; 181/102; 181/108
(58) Field of Search .................. 166/250.01, 250.17, 166/66; 73/152.58; 181/102, 108, 122; 367/35

(56) References Cited

U.S. PATENT DOCUMENTS

| | | | |
|---|---|---|---|
| 4,066,992 A | 1/1978 | Buller et al. ......... 340/15.5 MC |
| 4,702,343 A | 10/1987 | Paulsson ..................... 181/106 |
| 4,783,771 A | 11/1988 | Paulsson ...................... 367/57 |
| 4,805,725 A | 2/1989 | Paulsson ..................... 181/106 |
| 5,027,918 A * | 7/1991 | Cole ............................ 181/702 |
| 5,092,423 A * | 3/1992 | Petermann .................. 181/102 |
| 5,111,903 A | 5/1992 | Meynier ..................... 181/102 |
| 5,128,898 A | 7/1992 | Hill et al. ..................... 367/13 |
| 5,181,565 A | 1/1993 | Czernichow ................. 166/66 |
| 5,200,581 A | 4/1993 | Boyle et al. ................ 181/102 |
| 5,200,928 A | 4/1993 | MaCleod ...................... 367/27 |
| 5,243,562 A * | 9/1993 | Laurent et al. ......... 166/250.16 |
| 5,300,929 A | 4/1994 | MacLeod .................. 340/853.8 |
| 5,469,408 A | 11/1995 | Woo ........................... 367/182 |
| 5,555,222 A | 9/1996 | Woo ........................... 367/187 |
| 5,747,750 A | 5/1998 | Bailey et al. ............... 181/112 |
| 5,829,520 A | 11/1998 | Johnson .................. 166/250.01 |
| 5,866,827 A | 2/1999 | Stewart et al. ................. 73/784 |
| 5,962,819 A | 10/1999 | Paulsson ..................... 181/102 |
| 6,131,658 A * | 10/2000 | Minear .................... 166/250.01 |
| 6,135,204 A * | 10/2000 | McCabe et al. ......... 166/250.17 |

FOREIGN PATENT DOCUMENTS

| | | | |
|---|---|---|---|
| GB | 2253699 A | 9/1992 | |
| GB | 2345709 A | 7/2000 | ........... E21B/47/00 |

OTHER PUBLICATIONS

Createch Industrie, *A Triaxial Geophone Sonde*, pp. 1–4.

* cited by examiner

Primary Examiner—David Bagnell
Assistant Examiner—Brian Halford
(74) Attorney, Agent, or Firm—Madan, Mossman & Sriram, P.C.

(57) ABSTRACT

A method and apparatus for placing acoustic devices in wellbores. The method comprises: providing a tubing with at least one anchoring device in the wellbore, where the anchoring device is extendable to the wellbore to exert a force on the wellbore; attaching at least one acoustic device to at least one anchoring device; placing the tubing in the least one acoustic device attached to the at least one anchoring device in the wellbore; and setting the anchoring device to extend to the wellbore to exert a force on the wellbore, thereby coupling the acoustic device to the wellbore. The wellbore system comprises a tubing that has an annular space between the tubing and the wellbore. At least one anchoring device is disposed on an outer surface of the tubing and extends to and exerts a force on the wellbore. An acoustic device is attached to the anchoring device.

9 Claims, 2 Drawing Sheets

METHOD AND APPARATUS FOR DEPLOYMENT, MOUNTING AND COUPLING OF DOWNHOLE GEOPHONES

CROSS REFERENCES TO RELATED APPLICATIONS

This application claims priority from U.S. Provisional Application Serial No. 60/165,272 filed on Nov. 12, 1999.

BACKGROUND OF THE INVENTION

1. Field of the Invention

This invention relates to downhole seismic services and more particularly to a method for deployment, mounting and coupling of motion sensors and sources downhole.

2. Description of the Related Art

Seismic sources and sensors are often deployed in wellbores for a variety of oilfield operations, including monitoring of injection well operations, fracturing operations, performing "seismic-profiling" surveys to obtain enhanced subsurface seismic maps and monitoring downhole vibrations. Such operations include slim-to large-diameter boreholes, vertical to horizontal wells, open and cased holes, and high pressure and high temperature wells. Downhole sensors are sometimes utilized in combination with other logging services, either wireline, coiled tubing-conveyed, or with pipe to provide additional reservoir information.

Seismic sensors deployed in wellbores are particularly useful to monitor fracturing and injection well operations, to generate cross-well information and to obtain seismic measurements over time, to obtain enhanced subsurface maps and to improve reservoir modeling. However, the majority of seismic data gathering is accomplished by wireline methods or by deploying seismic sensors such as geophones on coiled tubing or production pipe. Multi-component geophones are usually preferred for such applications. Multi-component geophones sense motion in one or more directions. An example is the classical three (3) component geophone which detects particle motion in three mutually orthogonal directions (x, y and z directions).

An inherent problem with commonly utilized deployment methods for motion sensors in wellbores is the presence of high amplitude vibrations. The high amplitude vibrations may be due to the motion of the wireline or tubing used to carry these sensors in the wellbore. Even when these motion sensors are attached to the tubing, the sensors are subjected to substantial undesired motion due to the movement of the tubing in the wellbore or other operating factors. Ideally, a sensor deployment system should be free of all motion, thus enabling the sensors to accurately detect motion due to induced acoustic signals. Presence of spurious motion associated with movement of the tubing in the wellbore can significantly reduce the signal to noise ratio and mask the desired seismic signal in a high amplitude noise field.

Thus there is a need for a method and apparatus that reduces motion and noise associated with movement of tubing in the wellbore.

SUMMARY OF THE INVENTION

Geophones which are rigidly coupled to the wellbore, particularly in production wells, can provide high fidelity signals, i.e., with high signal to noise ratio. Such sensors are less likely to resonate. Distributed sensors can provide measurements useful for a number of applications, including monitoring of fracturing, seismic-profiling surveys, cross-well tomography and monitoring of injection operations. Directly coupling of the seismic receivers to the borehole, wherein the coupling force is substantially greater than the radial and axial force on the sensor due to operating conditions, provides signals with the desired high fidelity. Inadequate or defective coupling, however, induces distortion of seismic wavelets, including data amplitude loss, phase change and bandwidth reduction. Downhole ambient noise can swamp recorded data. It is also well known that the quality of the data detected by the motion sensors improves with the use of receiver arrays (distributed sensors) and with the acquisition of redundant data.

Seismic sources are also placed in wellbores to induce acoustic waves in the formation for the kinds of operations described above with respect to receivers. Vibratory sources are often used as the acoustic sources. Directly coupling of the acoustic source in the wellbore greatly impacts the amount of energy transmitted into the formation. Smaller sources can be utilized with direct coupling because the energy loss between the source location and the receiver(s) is reduced.

In one aspect, the present invention provides a method of placing acoustic devices in wellbores. The method includes providing a tubing with at least one anchoring device in the wellbore, the anchoring device being extendable to the wellbore to exert a predetermined force on the wellbore, and attaching at least one acoustic device to at least one anchoring device; placing the tubing in the at least one acoustic device attached to at least one anchoring device in the wellbore; and setting the anchoring device to extend to the wellbore to exert a predetermined force on the wellbore, thereby coupling the acoustic device to the wellbore. The acoustic device is attached to the anchoring device so that the acoustic device would be located in an annulus between the tubing and the wellbore when the tubing is placed in the wellbore. Multiple spaced-apart acoustic devices may also be used. For example, spaced-apart acoustic detectors may be used in the wellbore, forming an array of detectors for detecting seismic wavelets.

The acoustic device used may be any one of a plurality of geophones, at least one source; or a combination including at least one acoustic source and at least one acoustic detector. The anchoring device may be any one of a hook-wall packer, an inflatable packer, a tubing anchor, a tubing hanger, a whipstock packer, a sump packer, a tubing centralizer, or a mechanically expandable elastomeric packer.

Thus, the present invention provides a wellbore for oilfield operations wherein the wellbore includes a tubing with an annular space between the tubing and the wellbore; and at least one anchoring device disposed on an outer surface of the tubing. The anchoring device extends to and exerts a predetermined force on the wellbore. An acoustic device is attached to the anchoring device prior to the placement of the tubing in the wellbore. When the anchoring device is set in the wellbore, it couples the acoustic sensor with the wellbore. A line attached to the acoustic device provides power (electrical, optical, hydraulic, etc.) to the acoustic device. This line also provides data communication and control between the acoustic device and surface control units, such as a processor, which may be a computer or another data processing and control unit such as a microprocessorbased unit.

Examples of the more important features of the invention have been summarized rather broadly in order that the detailed description that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

The present invention provides a method for directly coupling acoustic sources and motion sensors to a wellbore with a coupling force substantially greater than the radial or vertical force received by such devices during normal wellbore operations. In one method, the device is positioned contiguous to or as an integral part of a tubing-to-casing (or tubing-to-open hole) anchoring device utilized for anchoring to the production wellbore, thereby providing direct coupling of the device to the wellbore. Multi-component geophones are preferred acoustic detectors. Such a coupling method minimizes coupling losses associated with commonly utilized methods of deploying such devices in wellbores. Each anchored location of the device provides an acoustic node, either an acoustic source node or a seismic detection node.

Figure 1:
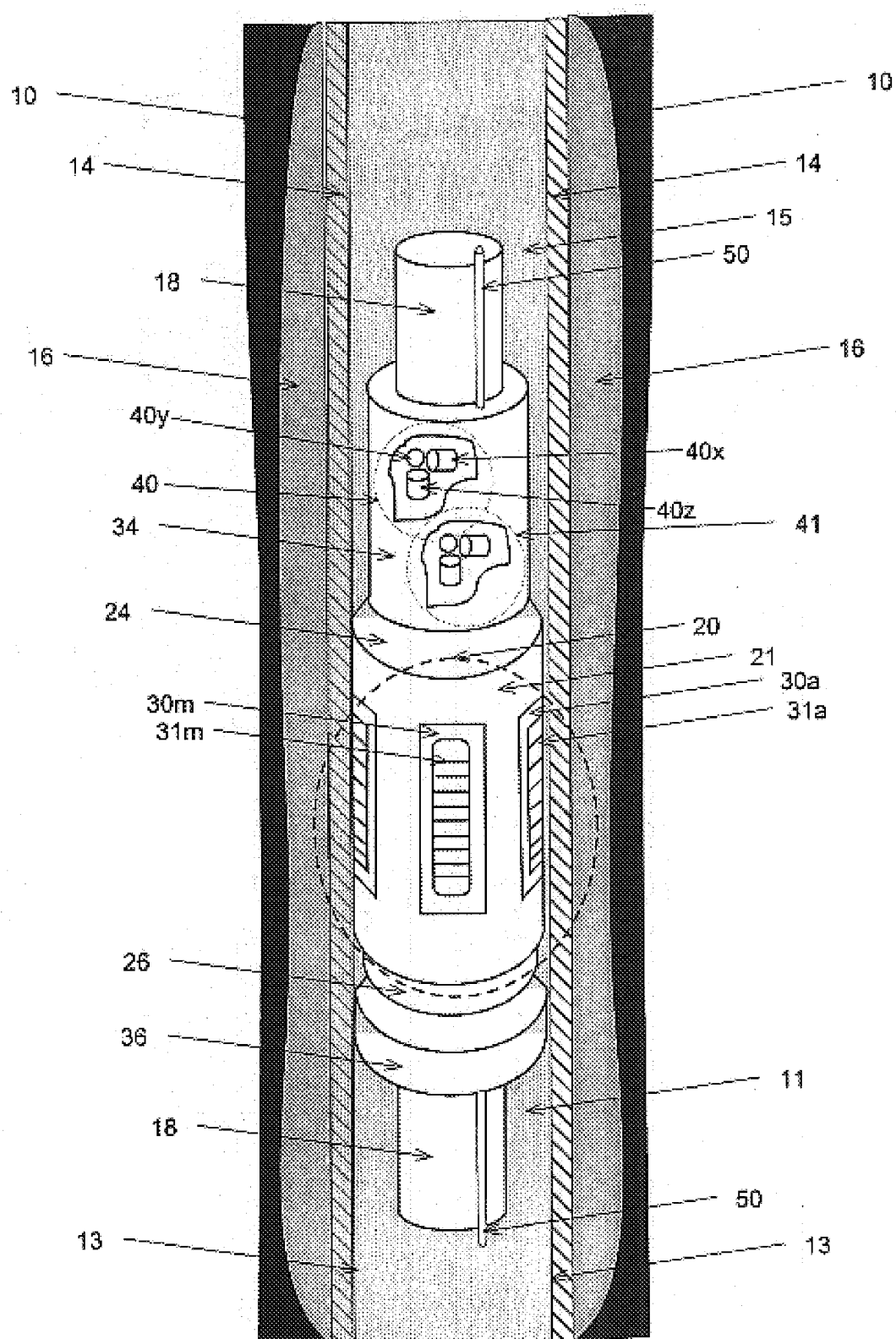
FIG. 1 shows a schematic diagram of mechanically coupling a multi-component motion sensor to a well casing or liner, according to one method of the present invention; and, FIG. 2 shows the deployment of a distributed sensors in a wellbore according to one method of the present invention.

FIG. 1 shows a schematic for the placement of an acoustic device in a production well 10. The well 10 shown is a cased well wherein a casing or liner 14 is set in the well with cement 16 between the well 10 and the casing 14. Typical production wells, i.e. wells that have been completed for producing oil/gas (formation fluid), include production tubing such as tubing 18. Often such tubing has a plurality of spaced-apart anchoring devices such as an anchor 20 which mechanically couples the tubing 18 to the well casing 14 and thus the wellbore 10. Such anchoring devices are mechanical devices and are disposed radially around the tubing 18. Such anchoring devices are commercially available and are thus not described in detail herein. For the purpose of illustration of the present invention and not as a limitation, FIG. 1 shows the preferred type of mechanical anchor 20 that has an upper slip cone 24 and a lower slip cone 26. A plurality of slips usually three to four, 30a–30m are provided in the anchor between the upper slip 24 and the lower slip 26. Each of the slips 30a–30m is designed to retractably extend from the anchor 20 to make contact with the casing 14. Each slip further includes a set of teeth which are designed to firmly set into the casing 14 when the corresponding slip is extended. FIG. 1 shows teeth 31a–31m respectively on slips 30a–30m. The slips 30a–30m may be set (extended to contact the casing 14) hydraulically via tubing pressure or via a separate capillary tubing (not shown), preferably affixed externally to the casing 14.

The anchor 20 also includes a top sub 34 above the upper slip cone 24 and a bottom sub 36 below the lower slip cone 26. The top sub 34 and the bottom sub 36 are threaded into the anchor body 21. In a production well, the casing 14 is set in the well 10 with cement 16 in the annulus 11 between the casing 14 and the inside wall 13 of the wellbore 10. After the casing 14 has been set, a production tubing 18 with a plurality of spaced apart anchoring devices (also referred to herein as anchor or anchors) along with other production equipment and devices (not shown, as such devices are well known in the art) is placed inside the casing 14. The production tubing usually extends to the lowest producing zone. There is usually an annulus space, such as space 15 between the production tubing 18 and the casing 14. FIG. 1 shows a pair of orthogonally-oriented three-component geophones 40 and 41. Elements 40x, 40y and 40z represent the three x, y, and z components of the sensor 40.

The use of the annular space 15 enables the orthogonal orientation of the individual geophone sets. Annular positioning also allows for redundant positioning of more than one set of geophones for differential operations. Direct coupling of the devices to the casing or wellbore—as part of the anchoring system—minimizes typical coupling efficiency losses. The annular mounting can also utilize acoustic isolation systems, thus preferentially decoupling the geophones from the tubing string and hence reducing the tubing-conducted noise while maintaining the preferred direct coupling of the device to the casing or the wellbore. Annular mounting enables geophysical surveying and data gathering without interfering with the production operations. The formation fluid may be produced through tubing 18 during any operation of the devices coupled to the wellbore according to the present invention. The devices may also be coupled to open holes, i.e., wellbores without the casing. In such wellbores, the anchor device is directly coupled to the wellbore interior. The coupling system described above is equally applicable to such open hole completions.

In the present invention, the force exerted on the wellbore by the anchor is substantially greater than any lateral (also referred to herein as radial) force or longitudinal or axial force received by the device during normal wellbore operations. Although mechanical anchors are preferred as the anchoring devices, any number of different devices may be utilized. Such devices may include, hook-wall packers, inflatable packers, tubing anchors, tubing hangers, whipstock packers, sump packers, tubing centralizers, and mechanically expandable elastomeric packers.

A power, control and data communication line or link 50 runs from the surface to the device 20. The line 50 is preferably run along the outside of the tubing 18 so that line 50 will be positioned in the annular space 15 and will not interfere with any wellbore production or maintenance operations. Any suitable conductors or combinations of different types of lines may be used. Fiber optic lines may be used if the devices used require optical energy or optical data transfer to the surface equipment. Other sensors that measure such parameters as acoustic pressure, temperature, reservoir pressure, and compass orientation can be included along with the motion sensor(s) on a common physical installation.

Figure 2:
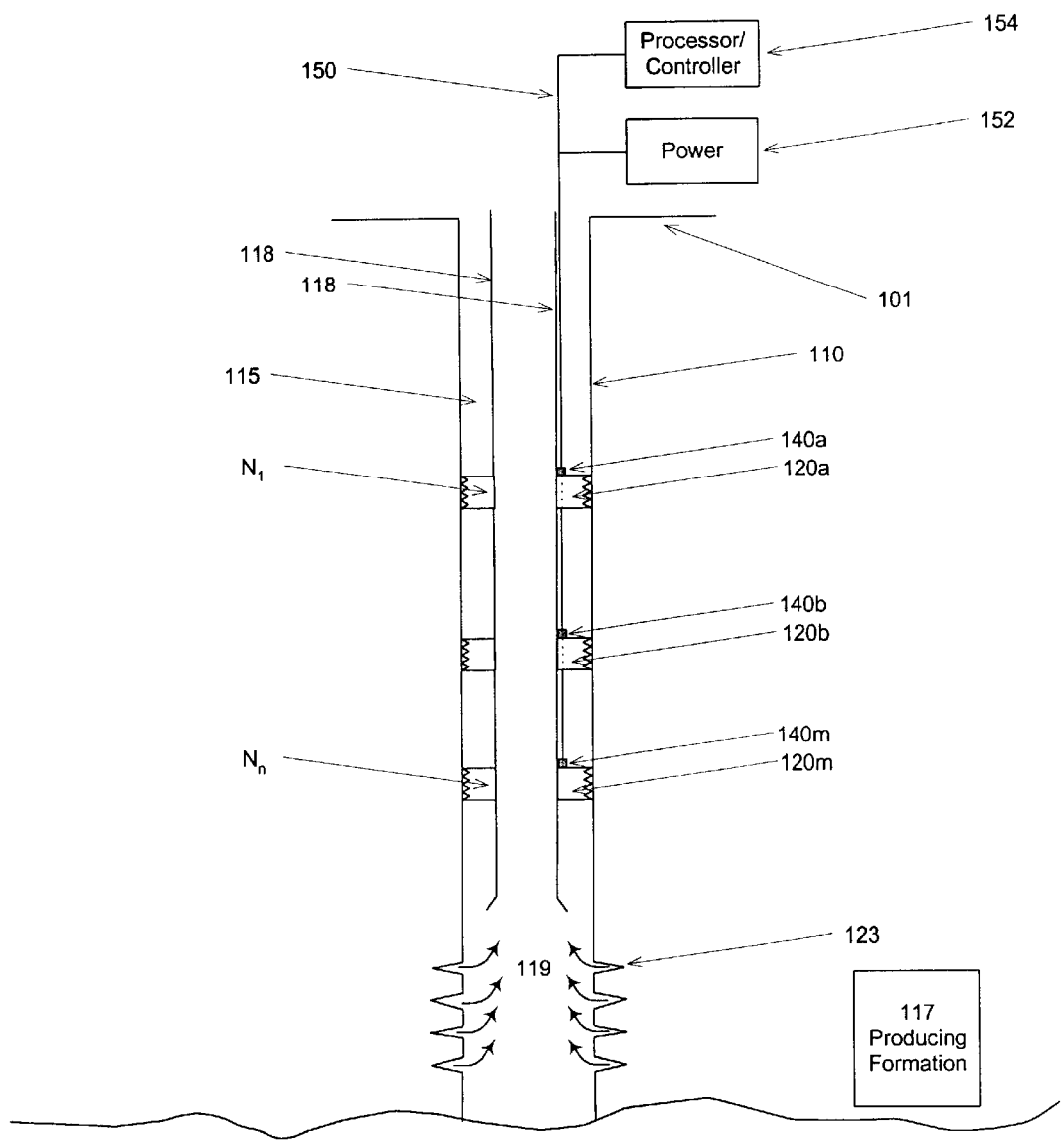

FIG. 2 shows a plurality of devices 120a–120m, in annulus 115, disposed around a tubing 118 suitably coupled to a wellbore 110 formed from a surface location 101 and penetrating a producing formation 117. Formation fluid (oil and gas) 119 from the producing formation 117 flows into the tubing via the perforations 123 and then to the surface 101. The location of each of the devices 120a–120m provides an acoustic node along wellbore 110. Acoustic devices 140a–140m respectively are attached or coupled to devices 120a–120m respectively. One or more lines, such as line 150, extending from the surface, provide power to the devices 140a–140m and data communication, and control between the devices and surface equipment. Particularly, energy to the devices 140 is provided by a source 152. A processor or control unit that may be a computer or a micro-processor-based unit receives sensor signals from the sensors 140 and provides and processes such data according to programs and models provided thereto. The control unit 154 also controls the operation of any acoustic sources deployed at any of the acoustic nodes $N_1-N_n$. The wellbore depicted in FIG. 2 is a vertical well. The devices are equally applicable to horizontal and multi-lateral well configurations.

The above-described system and method provide direct coupling of acoustic devices to the wellbore. The direct coupling force is substantially greater than any motion force observed by the device in the wellbore. This provides a more stable platform for those devices sensitive to the motion than do current methods. The response of the acoustic sensors, such as multiple-component geophones, provide better signals compared to conventional coupling methods. The acoustic devices coupled to the wellbores according to the methods of the present invention may be used for any application that requires deployment of acoustic sources and/or detectors in the wellbore. Such uses may include, but are not limited to cross-well tomography, vertical seismic and reverse vertical seismic profiling surveys, monitoring and control of injection well and fracturing operations.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method of placing at least one acoustic device in a wellbore, comprising:

(a) providing a tubing string for production or injection of fluid in said wellbore with at least one anchoring device, said tubing having a fluid flowing therein, said at lease one anchoring device attached to an external section of said tubing through an acoustic isolator, said anchoring device having a plurality of slips extendable to a casing disposed in the wellbore to exert a force on the casing, each of said slips having at least one set of teeth mounted to firmly set into the casing when said plurality of slips exerts force on said casing;

(b) attaching the at least one acoustic device to the at least one anchoring device so that the acoustic device is located in an annulus between the tubing and the casing when the tubing string is placed in the wellbore;

(c) placing said tubing string with the at least one acoustic device attached to said at least one anchoring device in the wellbore; and (d) extending the anchoring device to the casing to exert force on the casing, thereby firmly setting said teeth into the casing and coupling the acoustic device to the casing.

2. The method of claim 1, wherein said at least one acoustic device includes at least one of (i) a plurality of seismic motion sensors, (ii) at least one source; and (iii) a combination including at least one acoustic source and at least one acoustic detector.

3. The method of claim 1, wherein the at least one anchoring device is selected from a group consisting of (i) a hook-wall packer, (ii) an inflatable packer, (iii) a tubing anchor, (iv) a tubing hanger, (v) a whipstock packer, (vi) a sump packer, (vii) a tubing centralizer, and (viii) a mechanically expandable elastomeric packer.

4. The method of claim 1, wherein attaching the at least one acoustic device includes at least partially embedding the at least one acoustic device in a section of the anchoring device.

5. The method of claim 1, wherein the wellbore is one of (i) a production wellbore and (ii) an injection wellbore.

6. A wellbore system for placing at least one acoustic device in a wellbore for oilfield operations, comprising:

(a) a tubing string for production or injection of fluid placed in said wellbore with an annular space between the tubing string and a casing disposed in the wellbore, said tubing string having a fluid flowing therein;

(b) at least one anchoring device attached through an acoustic isolator to an outer periphery of said tubing string, said at least one anchoring device having a plurality of slips extending to and exerting a force upon said casing, each of said slips having at least one set of teeth mounted to firmly set into the casing when said plurality of slips exerts said force on said casing; and (c) at least one acoustic device attached to said tubing string and said at least one anchoring device prior to placement of said tubing string in said wellbore.

7. The wellbore system of claim 6, wherein the at least one acoustic device includes one of (i) a plurality of seismic motion sensors, (ii) at least one source; and (iii) a combination including at least one acoustic source and at least one acoustic detector.

8. The wellbore system of claim 6, wherein the at least one anchoring device is selected from a group consisting of (i) a hook-wall packer, (ii) an inflatable packer, (iii) a tubing anchor, (iv) a tubing hanger, (v) a whipstock packer, (vi) a sump packer, (vii) a tubing centralizer, and (viii) a mechanically expandable elastomeric packer.

9. The system of claim 6, wherein the wellbore is one of (i) a production wellbore and (ii) an injection wellbore.

* * * * *